United States Patent [19]

Ito et al.

[11] 4,419,730

[45] Dec. 6, 1983

[54] METHOD AND SYSTEM FOR CONTROLLING THE SETTING TEMPERATURE OF A VEHICLE AIR CONDITIONER

[75] Inventors: Yoji Ito, Kariya; Yozo Inoue, Chiryu; Kiyoshi Hara, Kariya, all of Japan

[73] Assignee: Nippondenso Co., Ltd., Kariya, Japan

[21] Appl. No.: 223,744

[22] Filed: Jan. 9, 1981

[30] Foreign Application Priority Data

Feb. 18, 1980 [JP] Japan .................................. 55-19565
Mar. 5, 1980 [JP] Japan .................................. 55-27825
Jul. 18, 1980 [JP] Japan .................................. 55-98894

[51] Int. Cl.³ ........................ G05D 23/00; H04M 1/00
[52] U.S. Cl. .............................. 364/424; 179/1 SM; 340/57; 364/557
[58] Field of Search .............. 364/424, 513, 557, 709, 364/710, 418; 179/1 SM; 340/52 R, 53, 54, 57; 235/92 EV, 92 MT; 237/28; 165/11 R, 41, 42; 377/19, 25

[56] References Cited

U.S. PATENT DOCUMENTS 4,215,240 7/1980 Ostrowski ........................ 179/1 SM
4,265,395 5/1981 Sumikawa et al. ............. 235/92 EV
4,276,925 7/1981 Palmieri ............................. 364/505
4,316,251 2/1982 Saito et al. ......................... 364/424

OTHER PUBLICATIONS

Mine et al.; "Study on Evaluation of Voice Output of Leading Information for a Car Driver"; Jnl. of Faculty of Engineer.; Univ. of Tokyo; vol. XXXV, No. 4; 05/01/80.
Tandon; "Tired of Just Reading Results? Let Your Instrument do the Talking"; Electronic Design, 24, vol. 26; 11/22/78.
Master Specialties Company Brochure: "Give Your Equipment a Voice in Its Operation"; Published Oct. 1974.

*Primary Examiner*—Errol A. Krass
*Attorney, Agent, or Firm*—Cushman, Darby & Cushman

[57] ABSTRACT

The temperature of the interior of a motor vehicle is controlled by an air conditioner in relation to a temperature setting which is variable in response to an action of a vehicle occupant. A voice synthesizer (17) is supplied with vocal information data supplied from a microcomputer (13) in response to the entry thereto of a temperature resetting command. The voice synthesizer generates a vocal announcement of a new temperature setting. Vocal announcements of successively varying temperature values are generated to allow the vehicle occupant to take a second action when a desired temperature value is announced.

12 Claims, 11 Drawing Figures

METHOD AND SYSTEM FOR CONTROLLING THE SETTING TEMPERATURE OF A VEHICLE AIR CONDITIONER

BACKGROUND OF THE INVENTION

The present invention relates to air conditioning systems, and particularly to a control system for an air conditioner mounted in a motor vehicle. More particularly, the invention relates to a system for resetting the reference temperature of such air conditioner by generating a vocal response to an instruction given by a vehicle occupant.

Conventionally, well-known air conditioners for automobiles are provided with a variable resistor with which the reference temperature setting is manually adjusted to a desired temperature. However, the manual operation of such variable resistors or the like tends to distract the vehicle driver from steering efforts to such an extent that it might lead to a dangerous situation.

SUMMARY OF THE INVENTION

The present invention has, for its object, the provision of a method and system for controlling the setting value of a vehicle air conditioner by generating in response to an action of the vehicle driver a vocal announcement of a temperature value to which the temperature setting is varied. The driver's action includes a finger action on a manually operated switch provided on the instrument panel or steering wheel or a voice recognizer that analyzes vocal information which the driver utters whenever he desires that the temperature setting be raised or lowered.

A microcomputer is advantageously employed. The microcomputer is programmed so that it performs a first routine in which the temperature of the vehicle interior is sensed and controlled to the setting value and it also performs a second routine whenever a temperature resetting command arises. In a first embodiment, a single switch is provided to permit entry of a command that the setting temperature is to be changed. In the second interrupt routine a series of vocal announcements of successively varying temperature values is generated in response to the entry of the command. Upon hearing a desired temperature value, the vehicle occupant depresses the switch to terminate the temperature variation. The temperature setting value is varied in succession in response to each vocal announcement so that the control point of the air conditioner is reset to that value which was given at the instant the switch was subsequently operated. The direction of variation of temperature is dependent on the initial value of the setting relative to a predetermined value. If the initial setting is higher than the predetermined value, the temperature setting is lowered in succession by 1° C., for example, from a high value to a low value.

In a second embodiment of the invention, two switches are provided for respective entry of temperature upward command and temperature downward command. In the second routine, a voice announcement of a temperature value higher than the setting value is generated in response to the entry of temperature upward command or a voice announcement of a lower temperature value than the setting when downward command is entered. The temperature setting is varied to that vocally announced value and the above process will be repeated as required until a desired temperature is reached.

In a third embodiment of the invention, a voice recognizer is provided to permit entry of temperature resetting command in the form of vocal announcement given by the vehicle occupant. The sound of his voice is analyzed by the voice recognizer to detect in which direction the temperature setting is to be varied. In response to such vocal entry of a resetting command, a vocal announcement of a temperature value is given and the temperature is reset to the announced value. This process will be repeated until a desired temperature value is reached.

BRIEF DESCRIPTION OF THE DRAWINGS

The invention will be further described by way of example with reference to the accompanying drawings, in which.

DETAILED DESCRIPTION

Figure 1:
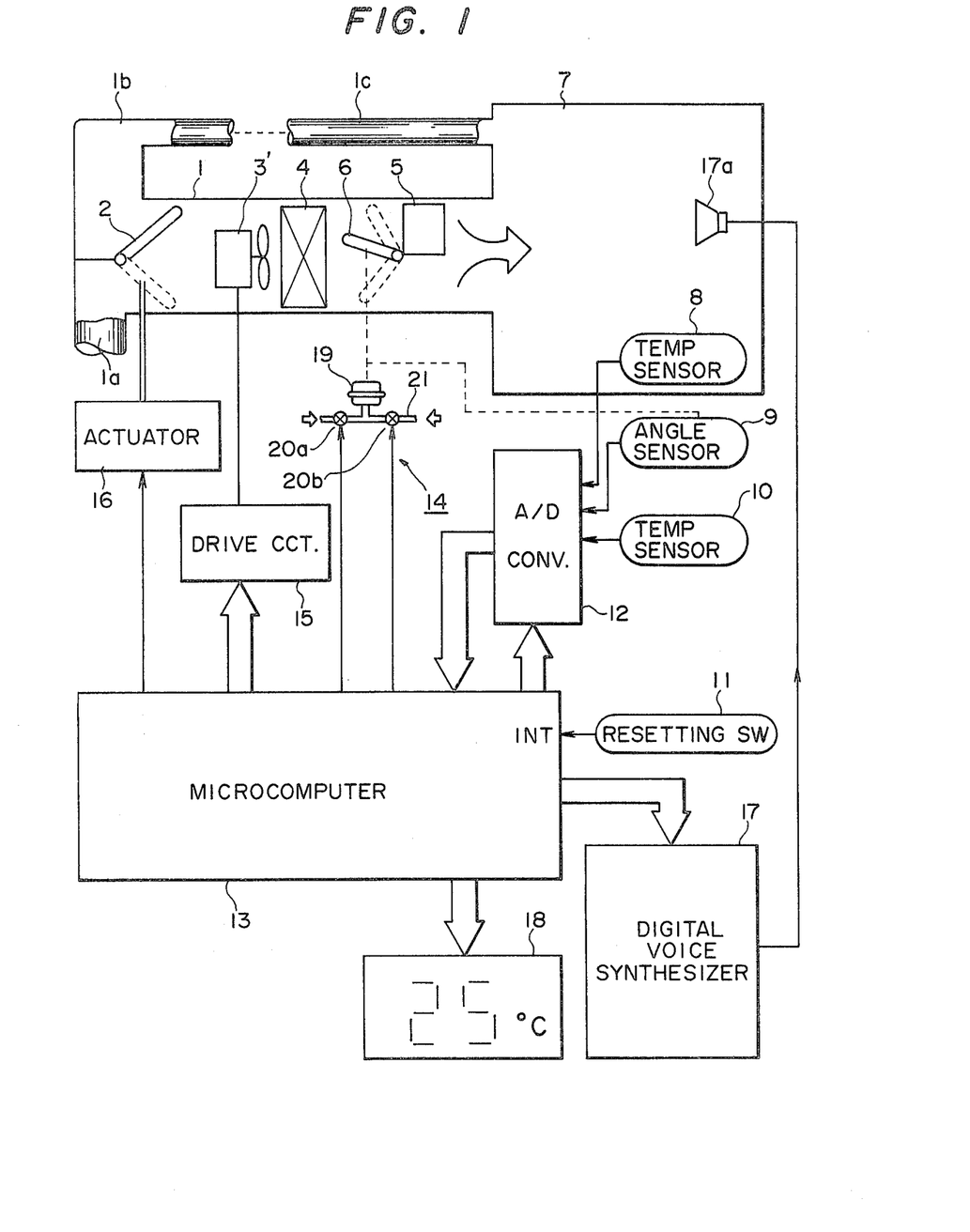
FIG. 1 is an illustration of a schematic block diagram of a first embodiment of the present invention.

Referring now to FIG. 1, a first preferred embodiment of the present invention is schematically illustrated. The air conditioning system of the embodiment includes an air intake duct 1 having its air inlet end selectively open to the atmosphere through an opening 1a or open to the vehicle interior 7 through an opening 1b and through a recirculating passage 1c depending on the angular position of a deflection plate 2 which is controlled by an actuator 16. The air outlet end of the duct 1 is open to the vehicle interior 7 to introduce thereinto a temperature-regulated air flow. When the deflection plate 2 is in an upward position, outside clean air is admitted into the duct 1 through opening 1a and when in a downward position air inside the vehicle is recirculated through opening 1b. A blower 3 is located inside the duct 1 for providing a forced air stream which is presented to an evaporator 4. The amount of air admitted into the duct 1 is controlled in response to a signal from a drive circuit 15. The evaporator 4 cools off the air as it is forced toward the outlet end of the duct 1 where a heating element 5 is located on the downstream side of an air mixing deflection plate 6. The heating element 5 receives heated water from the engine coolant jacket to warm up the air presented to it.

The mixing plate 6 regulates the amount of cool air to be mixed with warm air in response to a signal supplied from an actuator 14. As will be described, the deflection angle of the plate 6 is controlled in response to variations of temperature detected by interior temperature sensor 8 and outside temperature sensor 10 with reference to a temperature setting which is variable in accordance with the invention detailed below.

The actuator 14 includes a diaphragm operated device 19 and a pair of electromagnetic valves 20a and 20b which are arranged in a passage 21 to selectively supply engine negative pressure or atmospheric pressure to the diaphragm operated device 19 in response to control signals respectively supplied from the microcomputer 13. The device 19 responds to the pressure so created in the passage 21 by varying the deflection angle of the mixing member 6. The blower drive circuit 15 includes a latching circuit in which an air-quantity control digital signal from the microcomputer 13 is stored, a digital-analog converter to convert the stored data into a corresponding analog signal, and a thyristor controlled chopper circuit that interrupts the a.c. current supplied to the blower 3 at a rate that is a function of the analog signal. The actuator 16 is vacuum-operated in response to a refresh command signal supplied from the microcomputer 13 to refresh the air-conditioned interior by admitting outside clean air to the intake duct 1.

According to the invention, a digital voice synthesizer 17 of a known design is connected to the microcomputer 13 to generate from a speaker 17a a vocal announcement of a temperature value to which the setting is readjusted. As will be described later, the microcomputer 13 supplies a vocal temperature setting data to the synthesizer 17 and also to a digital display unit 18 to give vocal and visual indications of a readjusted temperature setting. The display unit 18 includes a latching circuit in which the setting data is stored and a decoder which translates the latched data into a form suitable for driving the segments of the display in two digits.

Figure 2:
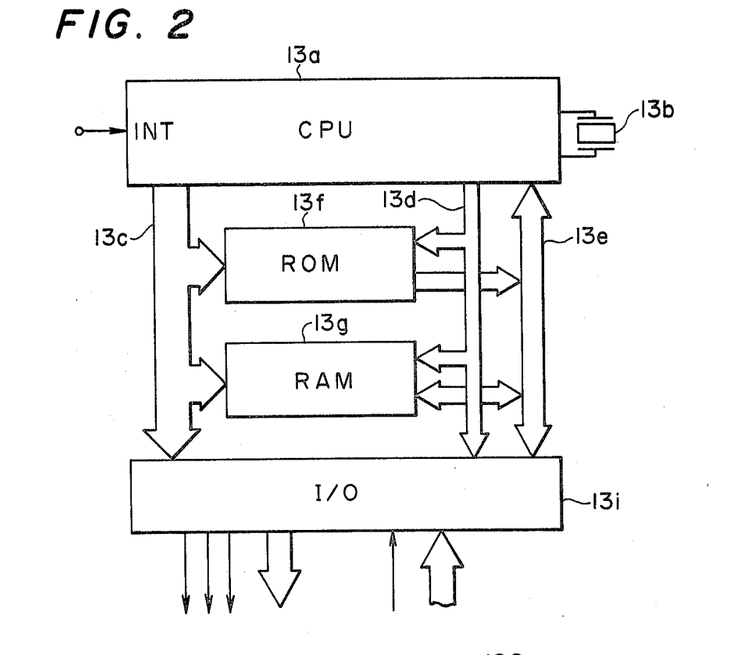
FIG. 2 is an illustration of the hardware of the microcomputer of FIG. 1.

FIG. 2 is an illustration of the details of the hardware of microcomputer 13. The microcomputer 13 includes a central processing unit 13a having a clock source 13b that generates a reference timing signal. The central processing unit operates on digital data supplied thereto in synchronism with the clock timing in a well known manner. A read-only memory 13f supplies data stored therein through data bus 13e to the microcomputer 13 under the control of address and control data buses 13c and 13d. A random access memory 13g is also under the control of the address and control data buses. An input-/output circuit 13i provides data transfer between the inside and outside of the microcomputer 13.

In the read-only memory 13f is stored a temperature control data describing a sequence of program steps for controlling the temperature of vehicle interior at a desired setting. Also stored is a temperature resetting data including decimal data 10 to 30 which are to be vocally reproduced. The CPU 13a successively reads off the data stored in ROM 13f and writes the processed intermediate results into RAM 13f which are to be read off whenever a demand arises.

The operation of microcomputer 13 will now be described with reference to flowcharts shown in FIGS. 3 to 5.

Figure 3:
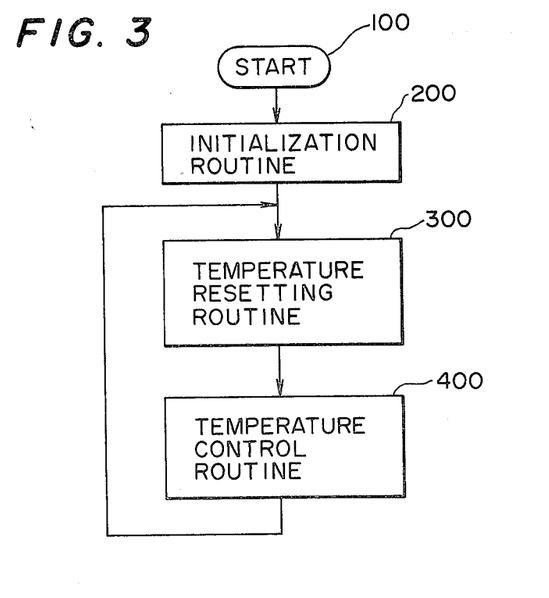
FIG. 3 is an illustration of a flowchart of the routines which the microcomputer of FIG. 1 is programmed to perform.
Figure 4:
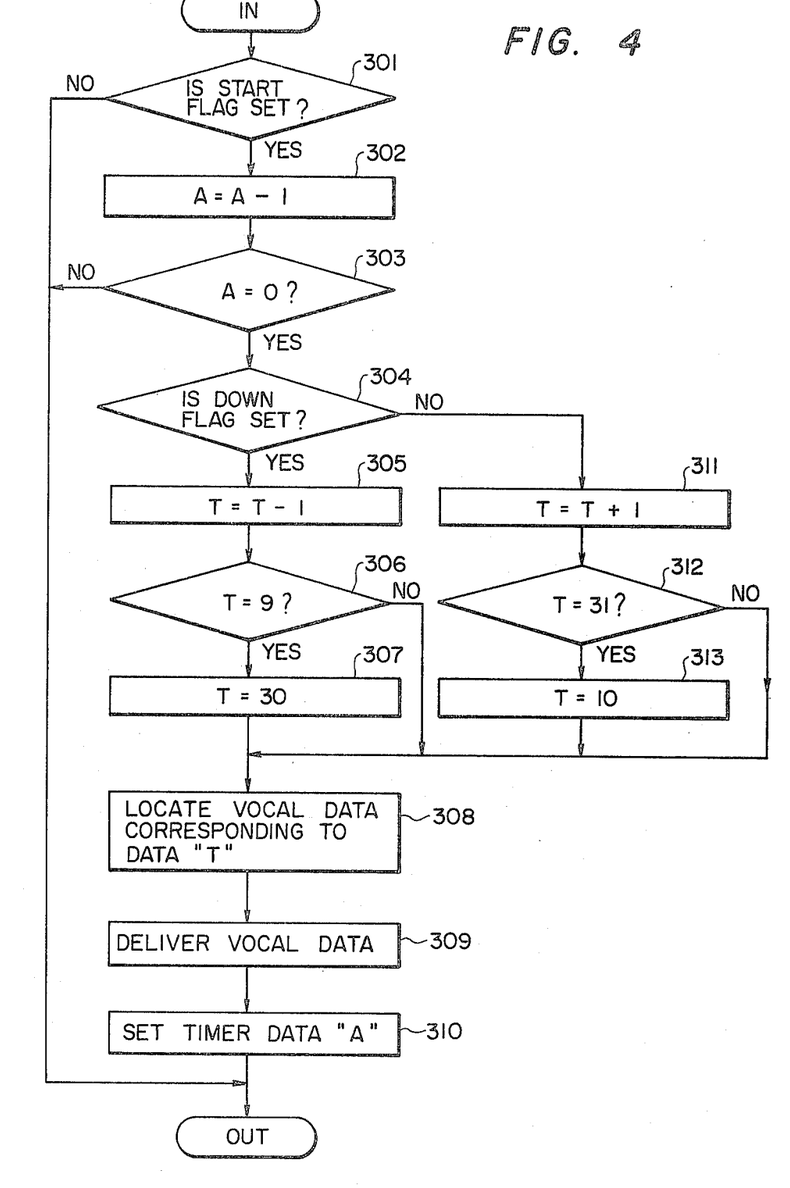
FIG. 4 is an illustration of a flowchart describing the details of the temperature resetting routine of FIG. 3.

Description will first proceed in connection with the general operation of microcomputer 13 with reference to FIG. 3. The microcomputer 13 starts executing operations from the start step 100. Program control then proceeds to an initializing routine 200 in which microcomputer 13 sets all the built-in registers, counters and latches to respective initial states. The initialization also involves resetting a start flag which will be described below, setting a first flag, setting timer data A to two-second interval, setting the reference temperature data Ts to 25 which is stored in a binary code in a specified storage cell of the RAM 13g, and transmitting the reference temperature data to display unit 18. Control then goes to temperature resetting routine 300.

In this temperature resetting routine, the microcomputer 13 executes operations necessary for generating vocal information corresponding to numerals 10 to 30 in succession as will be described later. Program control subsequently advances to a temperature control routine 400.

In this control routine 400, the microcomputer 13 executes various operations based on input data supplied from the temperature sensors 8, 10 and from the angle sensor 9 via A/D converter 12 and compares the input data with the reference temperature data Ts to generate temperature control data to be supplied to the blower control circuit 15, actuators 14 and 16. After execution of routine 400, program control returns to routine 300 to repeat the above main routine process at intervals of several hundred milliseconds.

During these repeated main routine operations, operator action to temperature resetting pushbutton 11 presents an interrupt command signal to an interrupt terminal INT of the microcomputer 13. The main routine operation is interrupted and program control shifts to the interrupt routine of FIG. 5 to execute operations required for resetting the reference temperature data Ts to a new value. Control will return to the main routine program after the steps of FIG. 5 are performed.

The operation of overall temperature control will now be described in more detail.

The air conditioning system is switched on in response to the operation of an ignition switch or air-conditioner switch. A voltage stabilizing power circuit (not shown) is powered from a car battery to supply constant d.c. voltage through ignition switch to various parts of the system including microcomputer 13. This power supply operation is of course performed prior to the start step 100. Program control starts from step 100 and goes to the initializing routine 200 and then proceeds to execute the main routine functions.

In the temperature resetting routine 300, program control advances from a decision step 301 (FIG. 4) in which the status of the start flag is checked. Since this start flag has been reset in the start step 200, "no" decision is made in the step 301. Program control now goes to the temperature control routine 400. In the absence of a temperature resetting command from pushbutton 11, the "no" decision is repeatedly issued from the step 301 at intervals of several hundred milliseconds and the microcomputer repeatedly performs subsequent temperature control routine at the same intervals on the basis of the initially established reference temperature, i.e. 25° C., so that the vehicle interior temperature is maintained at this initial setting. During this period, digital display unit 18 is supplied with temperature data representing 25° C.

Figure 5:
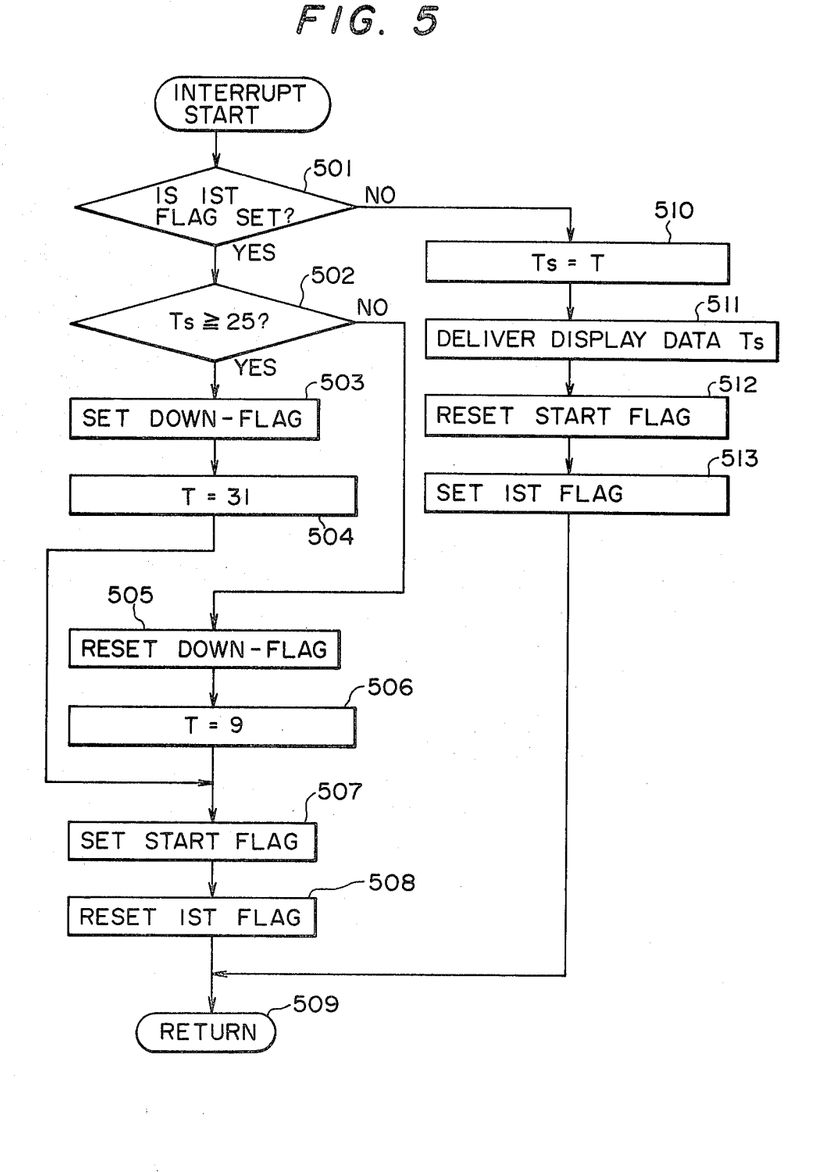
FIG. 5 is an illustration of a flowchart describing an interrupt subroutine associated with FIG. 4.

When pushbutton 11 is operated for resetting the reference setting value to 28° C. from the initial value of 25° C. placing a high level input to the interrupt terminal INT, the main routine operations are interrupted to execute the interrupt program illustrated in FIG. 5.

In FIG. 5, a decision step 501 is executed to determine whether the 1st flat has to be set or reset. Since the 1st flag was set in the initialization step 200, decision follows an "yes" route to a subsequent decision step 502 to check to see if the reference setting temperature is equal to or greater than 25° C. or smaller than 25° C. by checking the temperature data Ts against data "25". An "yes" decision issues and program control goes to a step 503 to set a down flag and thence to a step 504 to set the vocal temperature data T to "31". Subsequently, the start flag steps 507 and 508 are successively executed to set up the start flag and reset the 1st flag. Program control goes to a return step 509 to return to the previously interrupted main routine.

As the main routine reaches the step 301, "yes" decision is taken to execute a step 302 since the start flag has been set in the interrupt routine step 507 as previously described. The 2-second digital timer data A is decremented in the step 302 by "1". Subsequently, a step 303 is executed to see if the timer data A has decreased to zero. "No" decision is thus taken at this moment and control exists to the temperature control routine 400.

Thus, execution of steps 301 to 303 and temperature control steps of routine 400 is performed in succession at a few-hundred-millisecond cycles for an interval of 2 seconds until A=0 is detected in the step 303.

Control proceeds to a step 304 to check to see if the down flag has been set. Since this flag was set in the step 503, "yes" decision is taken to execute a step 305 to decrement the vocal temperature data T=31 by one, thus resulting in T=30. In a subsequent step 306, the presence of lower temperature data T=9 is checked. A "No" decision route is thus taken at this moment in order to locate vocal temperature data for T=30 in ROM 13f at step 308 and deliver this vocal data at step 309 to the vocal synthesizer 17 so that it produces a sound "t-h-i-r-t-y". The timer data A is set to a 2-second interval in a step 310 to proceed with the execution of the temperature control routine 400.

In subsequent execution of temperature resetting routine 300, steps 301 to 303 are successively executed until the timer data A becomes zero and steps 304, 305, 306, 308 and 309 are then executed to produce a sound "t-w-e-n-t-y-n-i-n-e". Thus, in the next execution of the routine 300 a sound "t-w-e-n-t-y-e-i-g-h-t" is produced.

On hearing the sound "twenty-eight", the vehicle driver operates the temperature resetting button 11. The main routine is interrupted and the interrupt routine, FIG. 5, is again executed. Since the 1st flag was previously reset in the step 508, "no" decision is taken in the step 501 to execute a step 510 to set the reference temperature data Ts to T=28. In the next step 511, the temperature setting data Ts=28 is delivered to the display unit 18 to give a visual indication of 28° C. The start flag and the 1st flag are respectively reset and set in steps 512 and 513, terminating the interrupt routine to return to the main routine.

The resetting of the start flag subsequently causes the step 301 to take a "no" decision route to the temperature control routine 400 to raise the interior temperature to 28° C.

If the initially set temperature value is lower than 25° C., "no" decision will be taken in the step 502 of the interrupt routine regardless of the direction in which the vocally sounded temperature is successively varied. Thus, in a step 505 the down flag is reset, and in a step 506 the temerature data T is set to 37 9" from which the vocal temperature data is increased. Following the steps 507 and 508 control returns to the temperature resetting routine 300 to execute the steps 301 to 303. In the step 304, "no" decision is made to add "1" to data T (=9) in a step 311. In a subsequent step 312, the microcomputer 13 checks to see if T=31. "No" decision is thus taken to execute steps 308 to 310 to generate a sound "t-e-n" and set the timer data A to return to the temperature control routine 400. Therefore, as the step 309 is repeatedly executed in subsequent execution of routine 300 vocal sounds, "e-l-e-v-e-n", "t-w-e-l-v-e" and so forth are succesively given until the operator pushes the button 11 at the instant a desired vocal announcement is given. It is seen from the above that the temperature setting can be reset to any value in a range between 10° C. and 30° C. when the switch 11 is operated at the instant a desired vocal sound is given.

If the vehicle occupant should fail to operate the button 11 when desired vocal information is being given, the vocal data is subsequently changed until it reaches a limit value whereupon the temperature data T is reset again to the initial value to repeat the previous steps. For example, if he misses the instant a data "28" is sounded, control continues until decision is made in the affirmative in the step 306 and subsequently in the step 307, T is updated to "30" to continue the vocal anouncement in the temperature downward direction. If he misses a desired point in a process where the vocal announcement is being given in the temperature upward derection starting at "10", decision is made in the affirmative in the step 312 when T becomes "31". The temperature data T is rewritten to "10" to repeat the above process.

Figure 6:
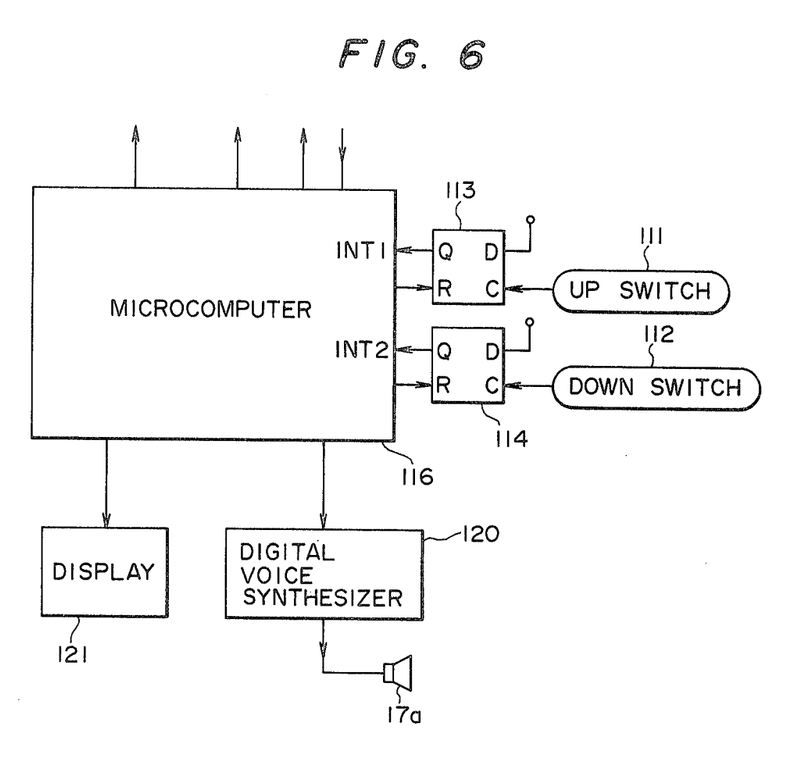
FIG. 6 is an illustration of a schematic block diagram of a second embodiment of the invention.
Figure 7:
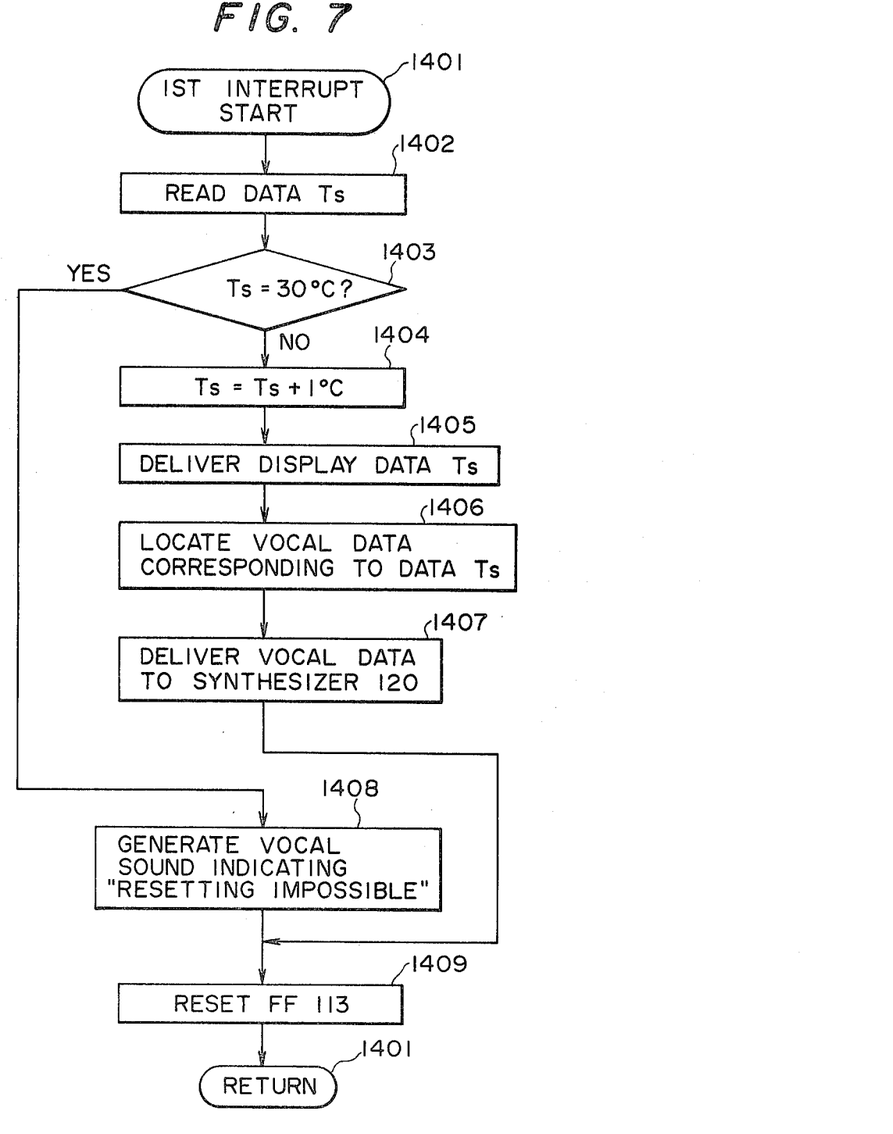
FIGS. 7 and 8 are illustrations of flowcharts associated with the second embodiment of FIG. 6 describing the details of a temperature resetting routine.
Figure 8:
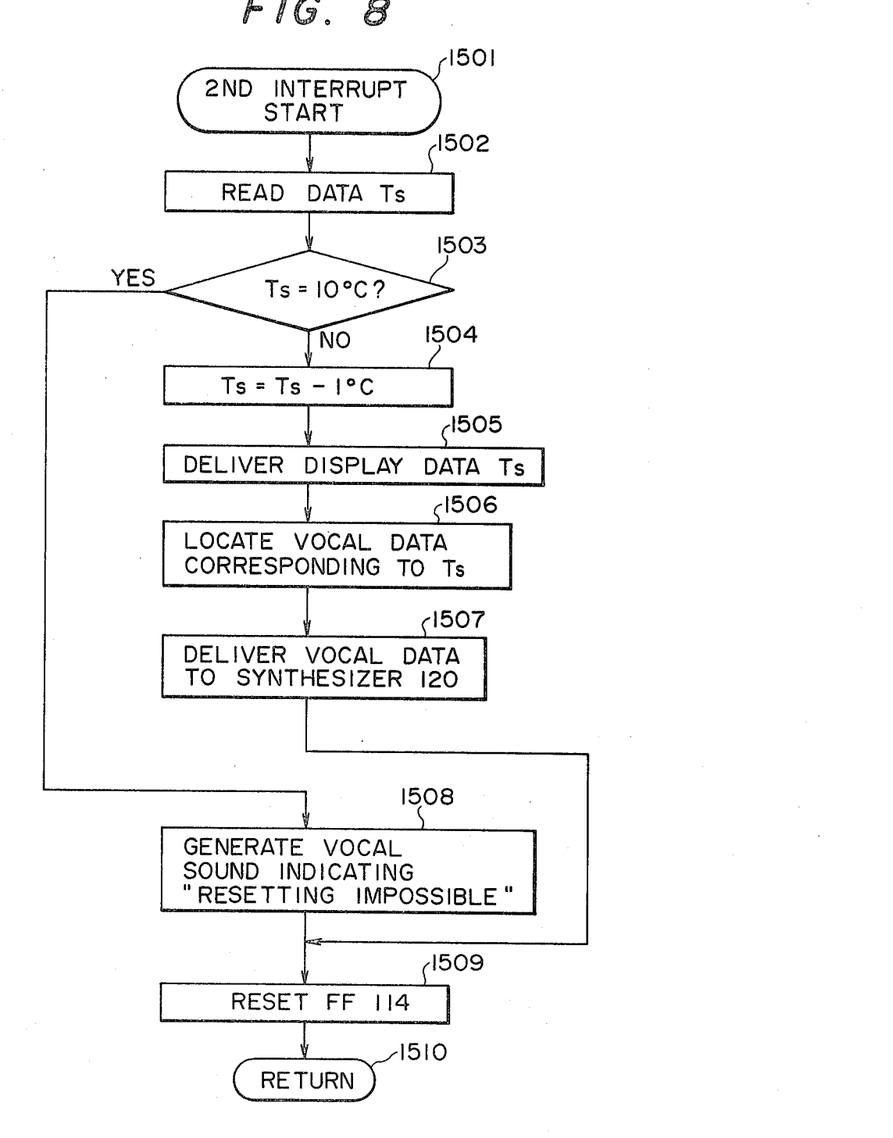

FIG. 6 is an illustration of the hardware of a second preferred embodiment of the present invention and FIGS. 7 and 8 are illustrations of flowcharts associated with the hardware of FIG. 6. The hardware of FIG. 6 is generally similar to that shown in FIG. 1 with the exception that temperature upward and downward resetting control switches 111 and 112 are employed instead of a single switch. D-type flip-flops 113 and 114 are provided to respond to the switches 111 and 112, respectively by notifying the microcomputer of the direction in which to vary the reference temperature setting. The hardware of the microcomputer 116 is of the same construction as that shown in FIG. 2 with the exception that two interrupt terminals INT1 and INT2 are provided and the main routine of the microcomputer 116 is also similar to that shown in FIG. 3 except for the temperature resetting routine 300.

The flowcharts shown in FIGS. 7 and 8 are illustrations of the details of temperature resetting routine 300 of the second embodiment of the invention.

In response to manual operation of upward switch 111 the flip-flop 113 provides a high-level Q output to the interrupt terminal INT1 of the microcomputer 116. The latter interrupts its main routine 400 and start executing a first interrupt routine depicted in FIG. 7 at step 1401 and goes to 1402 to read off the temperature data Ts which was previously set to 25° C. in the main routine. Program control advances to a step 1403 to check to see if the reference temperature Ts read off in the step 1402 corresponds to 30° C. A "no" decision route is thus taken to execute a step 1404 by adding "1" to Ts (=25° C.) to generate a display data indicating Ts=26° C. which is delivered to display unit 121. Step 1406 is then executed to locate vocal temperature data corresponding to Ts=25° C. in the read-only memory 13f. In a step 1407 the located data is delivered to the voice synthesizer 120 at a repetition rate of a few milliseconds, so that a vocal sound "t-w-e-n-t-y-s-i-x" is produced. Program control proceeds to a step 1409 to reset the D flip-flop 113 to enable the upward switch 111 for subsequent operator action. Control now returns through step 1410 to the main routine 400 with which vehicle inside temperature is controlled to the updated reference temperature of 26° C.

Upon subsequent operation of the upward switch 111, the first interrupt routine is repeated, whereby 27° C. is visually and vocally indicated and in the subsequent main routine operation the vehicle interior temperature is controlled to the updated reference temperature 27° C.

The switch 11 is thus repeatedly operated until desired temperature is reached. However, if the varying temperature reaches the upper limit point of 30° C., "yes" decision is made in the step 1403 and control goes to a step 1408 where a vocal data corresponding to the upper limit temperature is located in the ROM 16f to produce a vocal sound "r-e-s-e-t-t-i-n-g i-m-p-o-s-s-i-b-l-e". D flip-flop 113 is again reset in the step 1409 and control returns to the main routine. Thus, the reference temperature is maintained at 30° C.

When the downward switch 112 is operated, the interrupt port INT2 of the microcomputer is activated, whereby it interrupts its main routine and initiates a second interrupt routine, FIG. 8, which starts with a step 1501. At step 1502 the reference temperature data Ts is read off for making a comparison with a lower limit point of 10° C. in a subsequent step 1503. A "no" decision route is taken if the reference temperature Ts is in a range from 11° C. to 30° C. Control proceeds to a step 1504 to subtract "1" from the reference value Ts. Subsequently in a step 505 the updated Ts is digitally displayed on unit 121 and in a step 1506 the corresponding vocal information data is located in the ROM 13f and delivered at step 1507 to the synthesizer 120. D flip-flop 114 is then reset in a step 1509 and through step 1510 control returns to the main routine to control the vehicle interior temperature to the reference temperature which has been reduced by 1° C. from the previous setting.

Repeated operations of downward switch 112 allow the reference setting to successively lower to a desired point which is limited to the lower limit temperature of 10° C. If this lower limit point is reached, operation of downward switch 112 will result in an "yes" decision taken from step 1503 to a step 1508 to generate a vocal information "r-e-s-e-t-t-i-n-g i-m-p-o-s-s-i-b-l-e". Control passes through step 1509 resetting D flip-flop 114 and returns to the main routine, whereby the reference resetting operation terminates at 10° C.

In accordance with the second embodiment of the invention, the temperature resetting control method involves varying a reference setting value by a predetermined amount in response to each operator action and automatically controlling the vehicle interior temperature to the newly adjusted reference setting.

Figure 9:
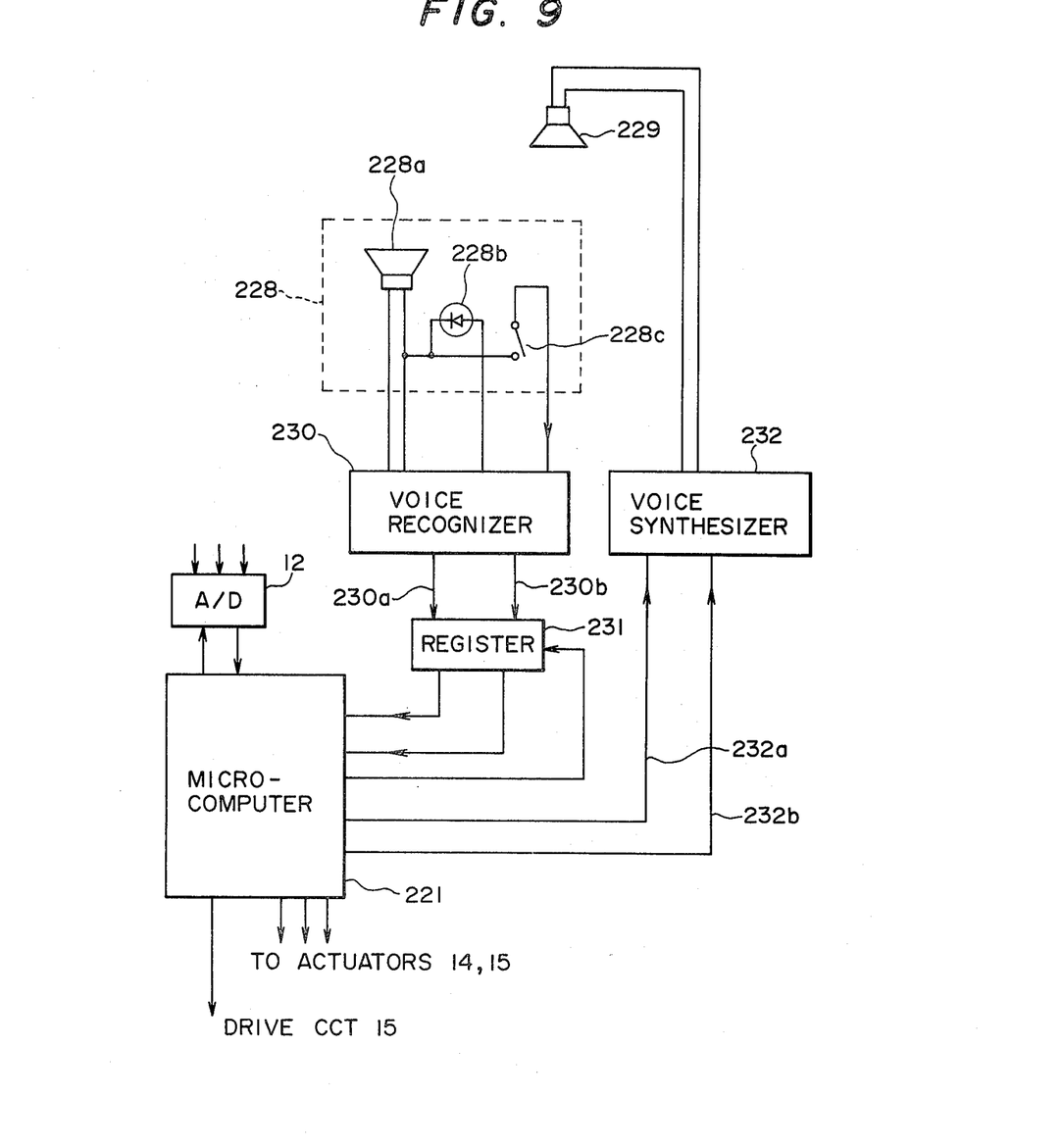
FIG. 9 is an illustration of a schematic block diagram of a third embodiment of the invention.

FIG. 9 is an illustration of a third preferred embodiment of the present invention in which temperature resetting switch or switches are replaced with a voice recognizer 230 of a conventional design to permit vehicle occupant to enter vocal information as a temperature resetting signal whenever he desires a temperature change. A microphone circuit 228 includes a microphone 228a, an entry mode indicating light-emitting diode 228b, and a press-talk switch 228c all of which are housed in a one-piece hand-held unit which is mounted on a convenient location easily accessible by the vehicle occupant.

When the press-talk switch 228c is operated, the voice recognizer 230 activates the light-emitting diode 228b to indicate that it is ready to accept voiced instructions and proceeds to analyze the signal received at the microphone 228a. The voice recognizer 230 provides a logical one to line 230a when the vehicle occupant speaks "its'cold" and provides a logical one to line 230b when he speaks "it's hot" into the microphone 228a. A buffer memory or register 231 stores the logic output signal from the voice recognizer 230 supplied respectively through lines 230a and 230b and is reset in response to a reset signal supplied from the microcomputer 221.

A voice synthesizer 232 receives temperature indicating digital data from the microcomputer 221 to provide an audio signal to be supplied to a speaker 229 to generate vocal temperature announcement. For example, if the voice synthesizer 232 receives a logical one on lead 232a from the microcomputer 221, a voice announcement "temperature increases by one degree" is produced and in response to a logical one on lead 232b, the announcement "temperature decreases by one degree" is given. Alternatively, the output signal which are applied to the register 231 from the voice recognizer 230 may be applied directly to the voice synthesizer 232.

Figure 10:
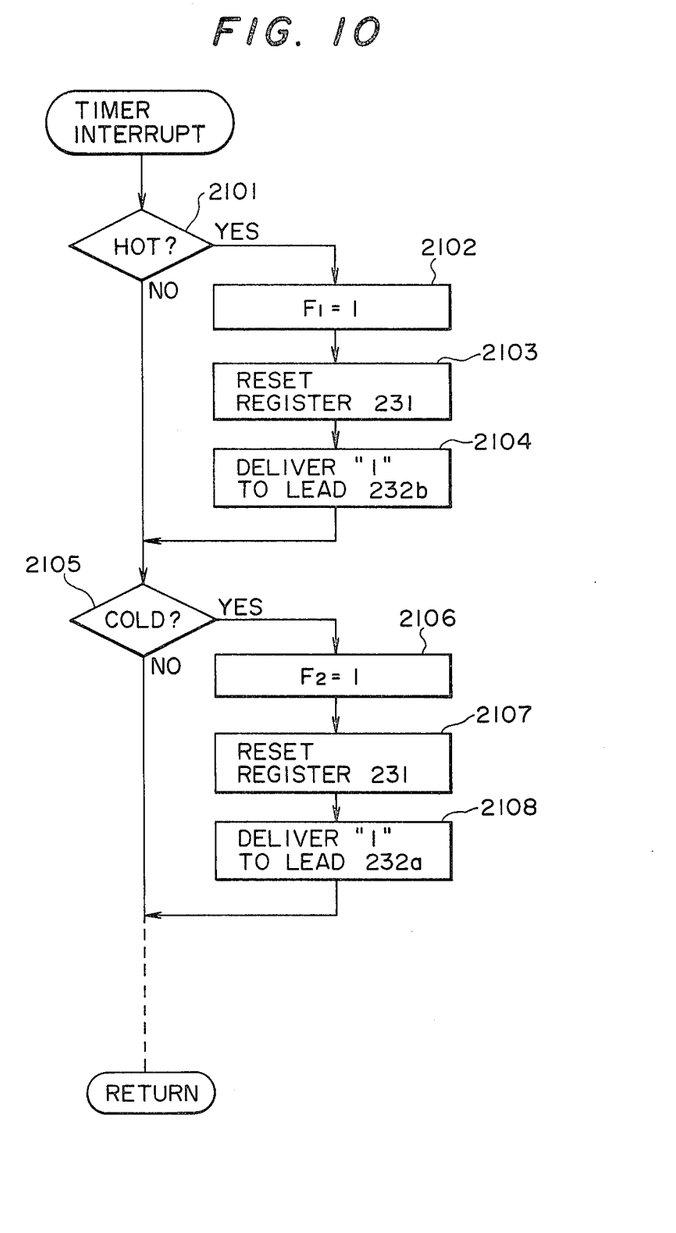
FIG. 10 is an illustration of a flowchart describing the details of a temperature resetting routine of the third embodiment.

FIG. 10 is an illustration of an interrupt routine in which the output of the registor 231 is checked at 20-millisecond intervals to determine whether the result of voice recognition is a temperature decrease instruction or a temperature increase instruction. If the voice recognizer 230 recognizes the input voice as an instruction that the interior temperature should be decreased, a flag $F_1$ is set, and if the instruction is to increase the temperature a flag $F_2$ is set. The voice synthesizer 232 is accordingly instructed by the microcomputer 221.

More specifically, if the words "it's hot" are sounded the microcomputer exits from step 2101 to a step 2102 to place "1" on the flag $F_1$. Subsequently, in a step 2103, the register 231 is reset and in a step 2104 the microcomputer provides a logical one on lead 232b to the voice synthesizer 232 so that a vocal announcement that "temperature decreases by one degree" is given. In a subsequent step 2105, a check is made to determine whether there is a logical one output on lead 230a from register 230 indicating that the occupant desires a higher setting, and if not, the interrupt routine is terminated. If the occupant's vocal instruction indicates a higher resetting, the microprocessor passes through the NO decision route of step 2101 to step 2105 and exits to step 2106 to place a logical one on the flag $F_2$ and subsequently in a step 2107 the register 231 is reset. In a following step 2108, a logical one output is placed on lead 232a to instruct the voice synthesizer 232 to generate a vocal announcement "temperature increases by one degree"

Figure 11:
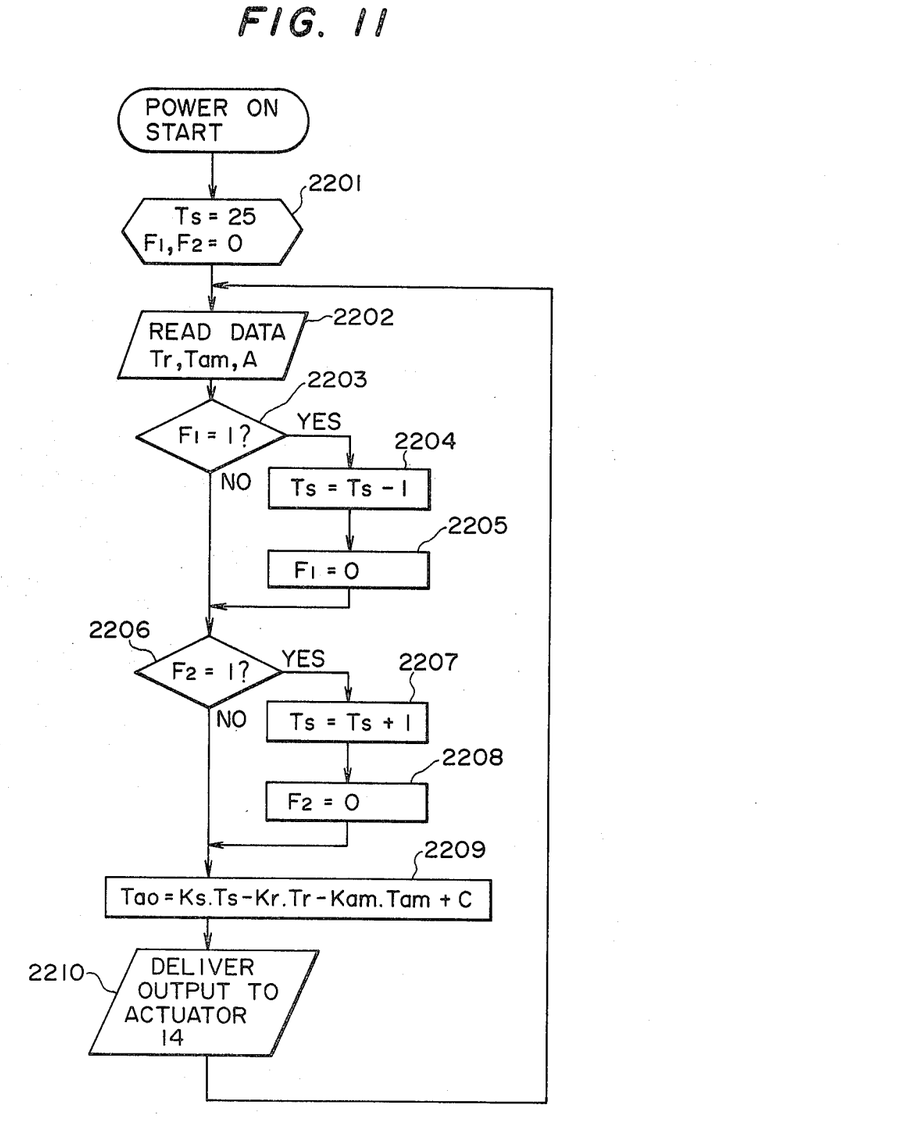
FIG. 11 is an illustration of a flowchart describing the details of a temperature control routine of the third embodiment.

FIG. 11 is an illustration of the main routine associated with the interrupt routine of FIG. 10 In this main routine, the microcomputer 221 operates on temperature data Tr and Tam supplied from the interior and exterior temperature sensors 8 and 10 and reference temperature data Ts to control the defelcetion angle of air mixing plate 16 and varies the reference temperature data Ts by a predetermined amount, typically, 1° C.

Microcomputer 221 starts operating in response to the system being switched on. In a step 2201 various registers and flags are set to their respective initial states. The reference temperature Ts is set to 25° C. and flags F1 and F2 are set to logical zero. The main routine is interrupted at the termination of the step 2201 whenever an interrupt command is generated.

In a step 2202, the computer receives various input signals from temperature sensors 8, 10 and angle sensor 9, these signals being converted into digital values Tr, Tam and A, respectively, by analog-digital converter 12.

In steps 2203 and 2206 the logical states of the flags $F_1$ and $F_2$ are interrogated. If $F_1 = 1$ (indicating that the vehicle occupant desires a temperature decrement) is detected, "yes" decision is taken at step 2203 and at step 2204 "1" is subtracted from data Ts to decrease the vehicle interior temperature by one degree. Flag $F_1$ is reset to zero in a step 2205 to render the system ready to accept a subsequent vocal instruction. On the other hand, if $F_2 = 1$ (indicating that the occupant desires temperature increment), a step 2207 is executed to add "1" to data Ts to increase the temperature by one degree and flag $F_2$ is reset to zero in a step 2208.

Control proceeds to a step 2209 in which the microcomputer computes an optimum value for temperature "Tao". This optimum value is related to vehicle interior temperature Tr, ambient temperature Tam and to reference temperature Ts, the optimum value Tao veing computed so that the difference between Tr and Ts is reduced substantially to zero. More specifically, data Ts, Tr and Tam are multiplied by constants Ks, Kr, Kam, respectively, which have been derived experimentally. An equation stated in the step 2209 is computed to seek the optimum value Tao. These constants have been derived on the assumption that the blower 3 is operating at a relatively low constant speed and the evaporator 4 and heating unit 5 are operating under normal conditions. In a step 2210 the angle of deflection plate 6 is corrected by the actuator 14 in response to the difference between the actual opening angle and the angle derived from the optimum value Tao.

As required, additional steps may be added to the main temperature control routine immediately following the step 2210 to permit control to return to the step 2202 to recycle the steps 2202 to 2210 at intervals of several hundreds milliseconds. During this recycled process the above described interrupt routine is introduced whenever temperature demand arises.

As described above, the air conditioning system of the present invention illustrated in FIG. 9 responds to vocally given command by stepwisely varying the reference setting from the initially established value of 25° C. If the total operating cycle period of voice recognizer 230 and microcomputer 221 would permit, the amount of stepwise variations in response to vocal commands may be increased to 2° C.

Since the vehicle occupant hears vocal information each time his vocal instruction is given to the system, the occupant has the feeling that the system is properly operating as he desires.

The present invention is not limited to the above described embodiments. Variations and modifications can be easily added to the present invention without departing from the scope of the invention which is only limited by the appended claims.

For example, the vocal instruction may be given in any sentence by including phrases which indicate the amount of variations to be changed as well as the direction of temperature variaition. Alternatively, the occupant may utter a sound of a predetermined frequency associated with the direction of temperature variation.

The amount of temperature variation in response to each occupant's command is not limited to 1 degree. That is, a variable incremental value could also be as well employed. More specifically, a 5% of the reference temperature may be varied in response to each instruction.

A timing device may also be employed in the air conditioning system of the invention to maintain the reference temperature at a renewed setting for a predetermined interval and to return the reference value to the original setting following the termination of such interval. This timed action serves to temporarily cool off or warm up the vehicle interior for a passenger when he enters the vehicle subsequently after it has been air-conditioned by a previous person. This is particularly advantageous when the vehicle outside is considerably hot or cold.

Furthermore, the digital voice synthesizer could be replaced with magnetic recording apparatus in which voice announcements are prerecorded in specified storage locations which are accessed by the microcomputer 13 to reproduce the vocal temperature announcements.

What is claimed is:

1. An apparatus for controlling an air conditioner mounted on a motor vehicle, said air conditioner being operable at a variable reference temperature setting, comprising:
    means for generating a command signal in response to an instruction given by a vehicle occupant;
    a voice synthesizer; and
    data processing means for generating a vocal announcement code indicative of a temperature value in response to a first occurrence of said command signal to cause said voice synthesizer to generate a vocal announcement of said temperature value to allow said vehicle occupant to give a subsequent instruction, and resetting said reference temperature setting to said temperature value in response to a second occurrence of said command signal.

2. An apparatus for controlling an air conditioner mounted on a motor vehicle, said air conditioner being operable at a variable reference temperature setting, comprising:
    means for generating a command signal in response to an instruction given by a vehicle occupant;
    a voice synthesizer; and
    data processing means for generating a series of vocal announcement codes in response to a first occurrence of said command signal to cause the voice synthesizer to generate a series of vocal announcements of successively varying temperature values to allow the occupant to give a subsequent instruction when a desired temperature is announced, and resetting the reference temperature setting to the desired temperature in response to a second occurrence of said command signal.

3. An apparatus as claimed in claim 3, further comprising display means for visually indicating said reference temperature setting and means for resetting said indicated reference temperature setting to said desired temperature.

4. An apparatus as claimed in claim 2, wherein said command signal generating means comprises a manually operated self-restoring switch.

5. An apparatus as claimed in claim 2, wherein said data processing means is programmed to execute the steps of
   (a) establishing a variable representing a temperature value;
   (b) varying said variable in response to said first occurrence of said command signal;
   (c) generating a vocal announcement code indicative of a temperature value corresponding to said variable to cause said voice synthesizer to generate a vocal announcement of said temperature value;
   (d) introducing a pause;
   (e) repeating the steps (b) to (d); and
   (f) resetting the reference temperature setting according to said variable in response to said second occurrence of said command signal.

6. An apparatus for controlling an air conditioner mounted on a motor vehicle, said air conditioner being operable at a variable reference temperature setting, comprising:
   means for generating a command signal in response to an instruction given by a vehicle occupant;
   a voice synthesizer; and
   data processing means programmed to execute the steps of:
   (a) establishing a reference temperature setting of said air conditioner;
   (b) detecting if said reference temperature setting is lower or higher than a predetermined value in response to a first occurrence of said command signal;
   (c) if said setting is lower than said predetermined value, causing said voice synthesizer to generate a first series of vocal announcements of successively decreasing values of temperature from a predetermined uppermost value to allow said occupant to give a second instruction when a desired temperature is announced;
   (d) if said setting is higher than said predetermined value, causing said voice synthesizer to generate a second series of vocal announcements of successively increasing values of temperature from a predetermined lowermost value to allow said occupant to give a second instruction when a desired temperature is announced;
   (e) terminating said first and second vocal announcements in response to a second occurrence of said command signal; and
   (f) resetting said reference temperature setting to either of said desired temperatures.

7. An apparatus as claimed in claim 6, further comprising display means for visually indicating said reference temperature setting and means for resetting said indicated reference temperature setting to either of said desired temperatures.

8. An apparatus as claimed in claim 6, wherein said command signal generating means comprises a manually operated self-restoring switch.

9. An apparatus for controlling an air conditioner mounted on a motor vehicle, said air conditioner being operable at a variable reference temperature setting, comprising:
   a pair of first and second manually exclusively operated switches;
   a voice synthesizer; and
   data processing means for generating a first vocal announcement code in response to an operation of the first switch to cause the voice synthesizer to generate a first vocal announcement notifying an incremental temperature value and a second vocal announcement code in response to an operation of the second switch to cause the vocal synthesizer to generate a second vocal announcement notifying a decremental temperature value and resetting the reference temperature resetting to the incremented and decremented variables.

10. An apparatus as claimed in claim 9, further comprising display means for visually indicating said reference temperature setting and means for resetting said indicated reference temperature setting according to said variable.

11. An apparatus for controlling an air conditioner mounted on a motor vehicle, said air conditioner being operable at a variable reference temperature setting, comprising:
   a voice recognizer for generating one of first and second command signals in response to first and second vocal instructions given by a vehicle occupant, respectively;
   a voice synthesizer; and
   data processing means for generating a first vocal announcement code in response to said first command signal to cause the voice synthesizer to generate a first vocal announcement notifying an incremental temperature value and incrementing the reference temperature setting by a degree corresponding to said incremental temperature value and generating a second vocal announcement code in response to said second command signal to cause the voice synthesizer to generate a second vocal announcement notifying a decremental temperature value and decrementing the reference temperature setting by a degree corresponding to said decremental temperature value.

12. An apparatus as claimed in claim 11, wherein said data processing means is programmed to execute the steps of:
   (a) establishing a variable representing said reference temperature setting;
   (b) incrementing said variable in response to said first command signal and decrementing said variable in response to said second command signal; and
   (c) causing said voice synthesizer to generate said first vocal announcement in response to said incremented variable and resetting said reference temperature setting to said incremented variable and causing said voice synthesizer to generate said second vocal announcement according to said decremented variable and resetting said reference temperature setting according to said decremented variable.

* * * * *